March 24, 1953 W. M. TRIGG 2,632,211
MOLDING OF RESIN TREATED COILS
Filed March 1, 1949
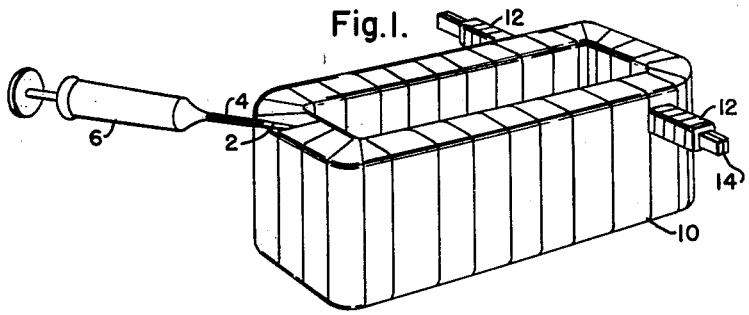
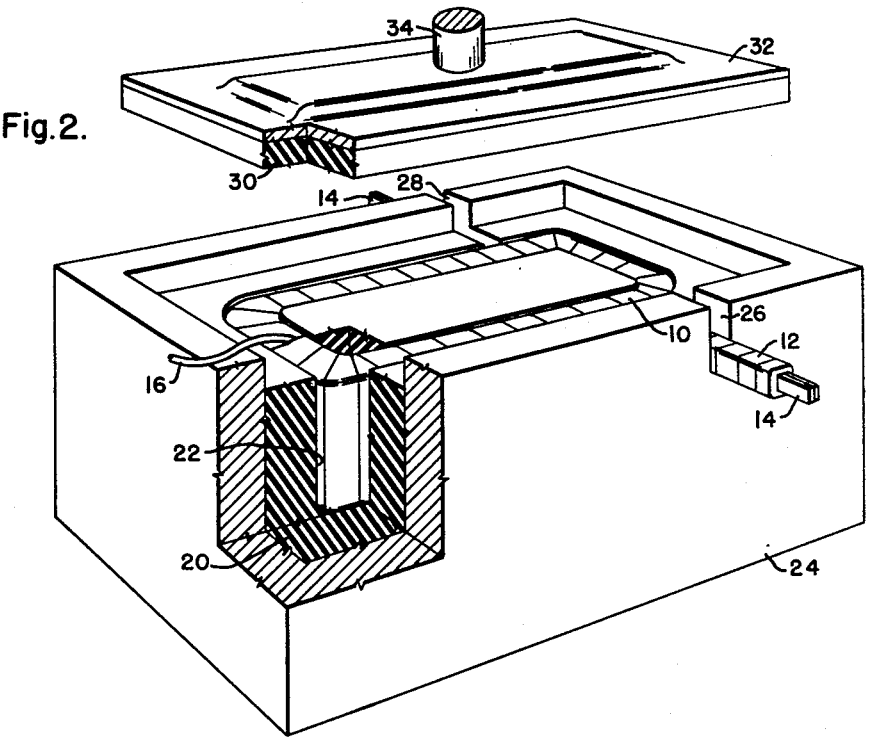
WITNESSES:
INVENTOR
Warren M. Trigg.
BY
ATTORNEY Patented Mar. 24, 1953

2,632,211

UNITED STATES PATENT OFFICE 2,632,211

MOLDING OF RESIN TREATED COILS

Warren M. Trigg, Pittsburgh, Pa., assignor to Westinghouse Electric Corporation, East Pittsburgh, Pa., a corporation of Pennsylvania Application March 1, 1949, Serial No. 79,095

3 Claims. (Cl. 18—59)

This invention relates to the process of producing resin treated shaped electrical insulating coils.

Heretofore, high voltage electrical coils provided with wrapped fibrous ground insulation have been treated with resinous impregnants by various procedures, but these procedures have been characterized by various shortcomings. In many cases the processing of an electrical coil has required an involved schedule of varnish dipping or impregnating steps, baking steps and often some after treatment was required. In many cases the process for treating the coils involved a total time of 50 hours or more. Even with such lengthy and involved treatment, the coils often were not properly shaped or adequately impregnated with resinous insulating compositions, whereby the fitting of the coils into electrical apparatus was difficult, and also the power factor, the heat transfer characteristics, and the dielectric strength of such coils have not been the optimum.

The object of the present invention is to provide a process for rapidly producing shaped coils provided with wrapped fibrous ground insulation solidly impregnated with resin to give optimum properties by curing resin treated coils in confined and compressed elastomeric molds having cavities corresponding to the desired shape of the coil.

A further object of the invention is to provide a process for injecting completely reactive compositions into the interior of prepared wrapped coils.

Other objects of the invention will, in part, be obvious and will, in part, appear hereinafter.

For a better understanding of the nature and objects of the invention, reference should be had to the following detailed description and drawing, in which:

Figure 1 is a view in perspective of a wrapped coil being injected with resinous composition, and Fig. 2 is a view in perspective partly broken of apparatus for shaping and molding coils.

It has been discovered that coils wrapped with fibrous or sheet insulation may be solidly impregnated with resinous insulation by injecting a resinous composition, preferably a completely reactive composition, under the wrapping to fill the interior interstices present between the coil turns and to penetrate into and between the layers of the exterior wrapping. Such injection may be effected by inserting a sharpened tubular member between the layers of wrapping, much as a hypodermic syringe is employed, or by building into the coil a hollow tube which has one end projecting through the wrapping, and introducing the resinous composition through either of the tubular members.

In accordance with a further feature of the present invention, coils of desired shape fully impregnated with solid resinous composition are produced my mummifying coils impregnated or treated with a fluid resinous composition in a confined and compressible elastomeric mold having cavities corresponding to the desired coil shape and heating coils while so confined to cure the applied resinous composition within the coil.

More specifically, coils are prepared by winding into desired shape a number of turns of an electrical conductor which ordinarily carries turn insulation. Coils may be prepared from enameled wire or wire covered with paper, asbestos, glass fibers, or cotton, alone or treated with enamel or other resin. Since the potential between turns in the average coil is moderate, the turn insulation need not be particularly heavy. However, the ground insulation, that is, the insulation at the outside of the coil, must be adequate to withstand the full potential to which the coil will be subjected. Also the ground insulation must be sufficient to withstand physical wear and tear, as well as effects of moisture and chemical deterioration. Coils may be shaped during winding into a tight, fully formed structure, although this is not necessary, and ordinarily the coil turns immediately after winding are somewhat loose with an excess of space between turns. The wound coil is then wrapped with a tape which may comprise mica tape or glass fiber tape, asbestos tape, paper or the like, with or without resin being present, in any desired combination. Thus coils for high voltage service have been prepared by wrapping one or more turns of a tape composed of mica flakes bonded by a resin to a fabric backing, and then one or more layers of glass fiber tape wrapped over the mica tape. As many as 16 separate layers of mica tape may be wrapped about the exterior of coils for high voltage service. The resulting wrapped coils are more or less formed to desired contour or shape, but the turns are ordinarily not tightly compacted, and air spaces and voids exist throughout the interior of the coils, as well as between turns of the ground insulation wrapping on the exterior of the coils.

A coil so prepared is then impregnated with a completely reactive fluid resinous composition capable of solidifying and heating the preferred process. The preferred process for impregnating the wrapped coil is by injection of a fluid resinous composition into the interior of the coil. Considerable success has been had in employing a hypodermic needle type of structure for injecting fluid resinous composition into the interior of the coil. The hypodermic needle or injection tube may be of a suitable diameter, as for example a pointed copper or steel tubing 1/50 to 1/8 of an inch in diameter and more, and it is connected to a supply of fluid resinous composition under pressure, so that after the injection tube is pushed or driven through the wrapping on the coil, the resinous composition may be injected through it into the interior of the coil until the composition exudes through the wrapping. In treating long coils, that is, coils from 2 to 20 feet in length, it may be necessary to inject the fluid composition at a number of points along the coil, to insure complete filling. The fluid resinous composition, when so injected, drives out any air or gas in the coil and fills the space in the coil with the required amount of the composition.

For particularly good results, the wrapped coil may be placed in a heated vacuum chamber either before or after one or more injection tubes have been placed therein and the coil subjected to a vacuum while heated to a temperature of as much as 175° C. to remove moisture, gases and the like therefrom. After having been thoroughly evacuated and dried, the fluid resinous composition may be readily injected through the tubes into the coil to fill the interstices and spaces therein.

I have employed a modification of this procedure by introducing one or more small diameter tubes of a resin such as polyvinylidene chloride or silicone rubber into the coil before wrapping, and then so wrapping the coil and tube that one end of the tube extends to the exterior of the wrapped coil. The tube or tubes can be connected to a supply of the resinous composition under pressure and the interior of the coil filled with the fluid resin. The tubes can be then withdrawn or else cut off close to the surface of the coil.

Referring to the Figure 1 of the drawing, there is illustrated this practice, wherein a taped coil 10 has the hollow injection tube 2 forced through the outer wrapping of the coil and fluid resinous composition conveyed to the hollow injection tube 2 by an attached flexible conduit 4 connected to a gun 6 containing a supply of the composition from which it can be forced under pressure. Suitable fluid resinous compositions will be disclosed hereinafter.

If the coil 10 has been formed with sufficient care so that it is of a suitably compact shape and the wrapping thereon is tightly applied, the injected composition may be cured or polymerized to a solid by heating the coil and the composition in an oven or by applying an electrical current through the leads 12 to generate heat internally in the coil to cause the injected composition to polymerize. The following example illustrates this practice:

*Example I*

A motor field coil composed of turns of heavy strap copper wrapped with asbestos cloth, was wrapped with several layers of asbestos cloth. The polyester composition A, described below, was injected into the coil at four places through a pointed copper tube 1/8 inch in external diameter until the composition exuded through the outer coil wrapping. The coil was heated to a temperature of 100° C. for one hour and the polyester was cured to solid resin. The electrical insulation characteristics and thermal dissipation properties were markedly superior to those possessed by similar coils impregnated in a vacuum varnish impregnating tank with a conventional volatile solvent varnish, baked six hours in an oven and then reimpregnated and baked 12 hours, the total treating time being over 30 hours, whereas the process of this invention required less than two hours.

The composition A was prepared by admixing (a) 35 parts by weight of monostyrene and (b) 65 parts by weight of the reaction product of one mole of maleic anhydride, one mole of adipic acid and 2 moles of propylene glycol heated at 240° C. and 2 moles of n-butanol slowly added until the product had an acid number of 5. The composition A was catalyzed with 0.1% t-butyl hydroperoxide.

However, better formed coils with more complete solid resin impregnation are obtained if the resin treated coils are confined in an elastomeric mold under pressure and the composition polymerized.

Referring to Fig. 2 of the drawing, there is illustrated suitable elastomeric mold apparatus for the shaping of a wrapped coil after resinous composition has been applied to the coil. The coil 10 with leads 12 extending from either side thereof terminating in the conductor 14 is placed within the elastomeric mold 20 having a cavity 22 shaped, with a small clearance, to the desired coil shape. While many resins will part freely from the elastomer, to assure easy removal of a formed coil, the mold may be lined with cellophane or tissue, or dusted with talc or mica powder. The elastomeric mold 20 may be prepared from either natural or synthetic rubber or other elastomeric material. Particularly good results have been obtained with polychloroprene rubber. Silicone rubbers have given good results, particularly for high temperature treatment of resinous compositions such as silicone resins. The elastomer may be from 1/2 inch to 2 inches in thickness or more to provide adequate comformation and pressure distribution.

The elastomeric mold 20 is confined within a box-like casing 24 of steel or other suitable material having the desired strength. The casing 24 is provided with slots 26 and 28 on either side thereof closely fitting to and permitting the leads 12 to extend externally from the mold and casing. It will be obvious that the slots 26 may be located in any position to conform with the coil leads. A hollow tube 16 is shown extending from the coil 10 for enabling fluid resinous composition to be introduced into the coil either before or after the coil has been placed in the elastomeric mold 20. Fluid resinous composition under pressure may be introduced into the coil through the tube 16 until the composition begins to escape from the turns of the wrapping on the exterior of the coil, upon which event the tube 16 may be cut off flush with the wrapping.

After the coil is placed in the mold and impregnated with the fluid resinous composition, the upper surface of the mold 20 is covered by a thick pad of elastomer 30 associated with a compressor plate 32 which can be forced down by an arm 34 into the interior of the casing 24, whereby the elastomers 20 and 30 can be compressed to apply pressure about the entire exterior of the coil 10. The elastomer will spread to and about the slots 26 and the leads 12 will be surrounded by compressed elastomer, thereby preventing any substantial amount of the fluid resinous composition from escaping from the coil. Pressures of as little as 5 p. s. i. to as much as 500 p. s. i. on the elastomer have been used.

The compressed coil and its associated casing 24 and plate 32 may be heated to a temperature at which the fluid composition within the coil will solidify. The heating of the coil has been accomplished most satisfactorily by connecting the conductors 14 to a source of current, either alternating or direct current, of a sufficient magnitude to generate heat at a rapid rate internally in the coil, thereby curing the fluid composition to a solid. In some cases, the casing 24 may be placed in an oven and heat applied through the conductors 14 at the same time.

Small coils weighing a few pounds have been fully processed in a mold similar to that shown in Fig. 2 of the drawing, within a few minutes after being placed in the cavity 22. In several cases current was introduced through the leads 14, the composition was converted to a solid and the coils were removed from the mold within 5 minutes. Upon releasing the plate 32, the coil 10 can be readily withdrawn and will be found to be shaped to desired dimensions and will be found to be solidly impregnated with composition. As one example of the benefits secured, in a particular coil I have found that the heat dissipation was increased 100% over the heat dissipation from an otherwise identical coil produced by conventional varnished dipping and oven baking procedures.

The following examples illustrate the practice of this feature of the invention.

*Example II*

A field coil of a total weight of 100 pounds was prepared from copper strap insulated with paper backed mica tape of a thickness of 5 mils, the exterior of the coil being wrapped with two layers of 7 mil thick glass tape. The resin composition A of Example I was injected into the coil. The coil was put into a mold composed of polychloroprene and compressed at 100 p. s. i. A current of 200 amperes was passed into the coil and within 15 minutes the composition was polymerized to a solid.

*Example III*

A railway motor field coil comprising turns of copper strap covered with glass fiber turn insulation was wrapped with one layer of half-lapped mica tape and one layer of half-lapped glass fiber tape. The wrapped coil was given a quick dip in a conventional volatile solvent varnish to coat the exterior glass fiber tape layer with the varnish, the varnish being dried and cured by baking ten minutes under infrared lamps. The coil was then impregnated with the resin composition B, described below, by injecting the composition through hollow tubes. The varnish applied to the glass fiber tape layer served to hold the resin composition within the coil without any loss by drainage. The impregnated coil was placed in an elastomeric mold and a pressure of 50 p. s. i. was applied to the elastomer. While so confined 200 amperes of current was applied to the coil leads. A temperature of 150° C. was reached in a few minutes as determined by a thermocouple buried in the tape on the coil. In ten minutes the resinous composition was fully polymerized to a solid.

The resin composition B was admixing 350 parts by weight of monostyrene with 650 parts by weight of the reaction product of 600 parts of tall oil and 130 parts by weight of glycerol heated for 3 hours at 150° C. then 98 parts of maleic anhydride were added and heating continued for 6 more hours to an acid number of 5. The composition B was catalyzed, before injecting into the coil, with 0.5% by weight of benzoyl peroxide.

While injection of the resinous composition into wrapped coils gives the optimum results, in some cases the resinous composition has been applied with the wrapping before the coils were cured in the elastomeric mold, as set forth in this example:

*Example IV*

The wound coil of Example II was wrapped with two thicknesses of 7 mil thick glass fiber tape carrying 13 mils thick layer of plastic uncured vulcanizable silicone elastomer, and placed in the mold. A pressure of 50 p. s. i. was applied to the elastomer to force the plastic silicone elastomer from the tape into the interstices of the coil, and a current of 400 amperes was applied to the coil leads for 30 minutes to cure the silicone elastomer.

Other flowable heat reactive compositions such as vulcanizable uncured butyl rubber and uncured neoprene rubber can be similarly applied to coils.

*Example V*

A coil having glass fiber backed mica tape wrapping was dipped in a 60% toluene solution or a partially reacted phenyl methyl siloxane having a ratio of R to Si of between 1 and 1.2. The coil was dried to remove the toluene solvent, and then placed in an elastomeric mold. The mold was confined and compressed about the coil at a pressure of 25 p. s. i. and current applied to the coil leads to heat the coil to a temperature of 175° C. for 30 minutes, at the end of which period the phenyl methyl siloxane resin was found to be cured to a solid.

In another case a wrapped coil was dipped in a solution of a melamine-aldehyde A-stage resin, the coil dried to drive off solvent and to convert the resin to the B-stage and the final curing was carried out under confinement in an elastomeric mold.

Numerous fluid or plastic compositions that are completely reactive to a solid state have been employed with satisfactory results in the practice of the present invention. Thus, besides the compositions above set forth, mixtures of gilsonite and linseed oil have been injected into coils, and the coils heated internally by passage of an electric current through the coil to gel the mixture. I have employed a completely polymerizable phenyl methyl organosiloxane resin which was injected into a coil and cured in a fraction of an hour by internal heating of the coil while confined in an elastomeric mold.

Completely-reactive compositions suitable for use in the process may include any fluid polymerizable composition that, upon being heated to a predetermined temperature, polymerizes into a relatively-hard resinous body. The fluid resinous composition may comprise a single polymerizable component such, for example, as diallyl phthalate, diallyl succinate, diallyl maleate, diallyl adipate, allyl alcohol, methallyl acrylate, diallyl ether, allyl acrylate, allyl crotonate or a partially condensed organosiloxane having a ratio of R to Si of from 1:1 to 1:1.5. It will be noted that many suitable compositions comprise at least one unsaturated group >C=C< capable of vinyl-type additive polymerization. The best results have been secured with monomers containing two or more of these unsaturated groups capable of polymerization upon being subjected to heat. It will be understood that mixtures of any two or more of the polymerizable monomers may be employed. Numerous other multi-component completely-reactive compositions are known to the art. Such compositions include, in many cases, an unsaturated resinous component—particularly an unsaturated alkyd resin—and an unsaturated polymerizable liquid monomer. Particularly good results have been secured by employing as the resinous alkyd resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a polyhydric alcohol such as glycol, glycerol, or pentaerythritol or mixtures thereof. Castor oil has been employed successfully in reactions with maleic anhydride, and the resultant castor oil maleate ester admixed with a polymerizable unsaturated monomer, for example, monostyrene, in the proportions of from 10 to 95 parts by weight of the monostyrene and from 90 to 5 parts by weight of the ester. In the preparation of the unsaturated alkyd esters, the unsaturated alpha-beta dicarboxylic acid or anhydride may be replaced with up to 90% of the weight thereof of a saturated aliphatic dicarboxylic acid or aryl dicarboxylic acid for anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols—particularly with dicarboxylic acids instead of their anhydrides.

The alkyd esters may be dissolved in a liquid unsaturated monomer having the group $H_2C=C<$. Suitable liquid unsaturated polymerizable monomers are: monostyrene, alpha methyl styrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene and divinyl benzene, or mixtures of two or more of any of these monomers.

The unsaturated, reactable composition preferably contains a polymerization catalyst. Suitable catalysts include peroxides, ozonides, perhalides, and peracids. Examples of suitable catalysts are benzoyl peroxide, tert-butyl perbenzoate, tert-butyl hydro-peroxide, di-t-butyl peroxide, di-t-butyl diperphthalate, 1-hydroxy cyclohexyl hydroperoxide-1 and ascaridol. 0.1% or less of the polymerization catalyst, based on the weight of the composition, may be employed, but more rapid reaction is obtained if the amount of the catalyst is higher—preferably from ½% to 2% by weight. The polymerization catalyst, when admixed in the completely-reactive composition, may cause it to increase in viscosity slowly at ordinary temperatures; and, therefore, it may be desirable to maintain the catalyzed composition to a temperature of 10° C. or lower, thereby increasing the tank life of the composition.

Since certain changes may be made in the above invention and different embodiments of the invention may be made without departing from the scope thereof, it is intended that all matter contained in the above described disclosure shall be interpreted as illustrative and not in a limiting sense.

I claim as my invention:

1. In the process of producing a resin impregnated and shaped insulated electrical coil having leads, the steps comprising wrapping the coil with a tight layer of sheet wrapping, placing the coil in a confinable and compressible elastomeric mold having a cavity shaped to the desired coil shape, the coil being completely enclosed by the elastomeric mold, disposing the coil leads through openings in the elastomeric mold, introducing under pressure through the wrapping and into the interior of the coil while so placed in the mold a fluid resinous composition capable of solidifying when heated, the wrapping serving to retain the resinous composition introduced into the coil, compressing the elastomeric mold to compact the coil into desired shape, the compression of the elastomeric mold closing about the leads to prevent escape of the fluid resinous composition, and passing an electric current through the leads of the confined coil to heat the resinous composition whereby the composition solidifies and the coil assumes the desired shape.

2. In the process of producing a resin impregnated and shaped insulated electrical coil, the steps comprising wrapping the coil with a sheet of fibrous material, applying to the wrapping a resin to impregnate the fibrous material to enable it to prevent the free passage of liquids therethrough, disposing a hollow injection tube of an insulating material to pass through the wrapping, injecting through the hollow injection tube and under the impregnated wrapping a quantity of a fluid resinous composition polymerizable under heat to a solid, the injection of resinous composition being effected under pressure so as to force the fluid resinous composition throughout the coil whereby to drive out gases and to fill the interstices of the coil therewith, the wrapping serving to retain the resinous composition introduced by the injection tube, placing the treated coil in a confinable and compressible elastomeric mold having a cavity shaped to the desired coil shape, the coil being completely enclosed by the elastomeric mold except for the coil leads which pass therethrough to the exterior of the mold to compact the coil into desired shape and close about the leads to prevent escape of composition, and passing an electric current through the leads of the confined coil to heat the resinous composition whereby the resinous composition solidifies and the coil assumes the desired shape.

3. In the process of producing a resin impregnated and shaped insulated electrical coil having an exterior wrapping, the steps comprising injecting by means of a hollow injection tube of an insulating material passing through the wrapping into the interior of the coil a completely reactive fluid resinous composition capable of solidifying when heated, placing the impregnated coil in an elastomeric mold having a cavity shaped to the desired coil shape, the elastomeric mold being confined and compressible, the coil being completely enclosed by the elastomeric mold except for the leads which pass therethrough to the exterior of the mold, compressing the elastomeric mold to compact the coil into desired shape and to close about the leads to prevent escape of resinous composition, passing an electric current through the leads of the confined coil to heat the resinous composition whereby the composition solidifies and the coil assumes the desired shape, and removing the portion of the injection tube exterior of the wrapping.

WARREN M. TRIGG.

REFERENCES CITED

The following references are of record in the file of this patent:

UNITED STATES PATENTS

| Number | Name | Date |
|---|---|---|
| 1,888,613 | Apple | Nov. 22, 1932 |
| 1,960,120 | Mohring | May 22, 1934 |
| 2,065,934 | Deutschmann | Dec. 29, 1936 |
| 2,172,243 | Goodnow | Sept. 5, 1939 |
| 2,368,327 | Rose | Jan. 30, 1945 |
| 2,382,857 | Camilli | Aug. 14, 1945 |
| 2,400,891 | Sigmund | May 28, 1946 |
| 2,464,029 | Ehrman | Mar. 8, 1949 |